(12) United States Patent
Stockhammer et al.

(10) Patent No.: US 11,356,706 B2
(45) Date of Patent: Jun. 7, 2022

(54) STORAGE AND DELIVERY OF VIDEO DATA FOR VIDEO CODING

(71) Applicant: QUALCOMM Incorporated, San Diego, CA (US)

(72) Inventors: Thomas Stockhammer, Bergen (DE); Imed Bouazizi, Frisco, TX (US); Dmytro Rusanovskyy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/143,611

(22) Filed: Jan. 7, 2021

(65) Prior Publication Data

US 2021/0211735 A1 Jul. 8, 2021

Related U.S. Application Data

(60) Provisional application No. 62/958,561, filed on Jan. 8, 2020.

(51) Int. Cl.
*H04N 19/70* (2014.01)
*H04N 19/186* (2014.01)
*H04N 19/184* (2014.01)

(52) U.S. Cl.
CPC ........... *H04N 19/70* (2014.11); *H04N 19/184* (2014.11); *H04N 19/186* (2014.11)

(58) Field of Classification Search
CPC ..... H04N 19/70; H04N 19/184; H04N 19/186
See application file for complete search history.

(56) References Cited

U.S. PATENT DOCUMENTS

2014/0022343 A1  1/2014  Chen
2018/0199071 A1*  7/2018  Wang ..................... H04N 19/44

FOREIGN PATENT DOCUMENTS

WO  WO-2020188273 A1 *  9/2020  ............. H04N 19/18
WO  WO-2021045656 A2 *  3/2021  ............. H04N 19/70
WO  WO-2021257120 A1 * 12/2021  ............ H04N 19/597

OTHER PUBLICATIONS

Bross B., et al., "Versatile Video Coding (Draft 7)," 16th JVET Meeting, Oct. 1, 2019-Oct. 11, 2019, Geneva, (The Joint Video Exploration Team of ISO/IEC JTC1/SC29/WG11 and ITU-T SG. 16 WP 3), No. JVET-P2001-vE, Nov. 12, 2019 (Nov. 12, 2019), XP030224328, 494 pages, Retrieved from the Internet: URL: http://phenix.int-evry.fr/jvet/doc_end_user/documents/16_Geneva/wg11/JVET-P2001-v14.zip JVET-P2001-vC.docx , [retrieved on Nov. 12, 2019], paragraphs [9.3.3.2], [9.3.3.6], [9.3.3.14], table 124.

(Continued)

*Primary Examiner* — Jae N Noh
(74) *Attorney, Agent, or Firm* — Campbell C. Chiang; Shumaker & Sieffert P.A.

(57) ABSTRACT

A device for processing video data can be configured to receive a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

30 Claims, 8 Drawing Sheets

(56) References Cited

OTHER PUBLICATIONS

Choi K., et al., "Text of ISO/IEC DIS 23094-1, Essential Video Coding," 128th MPEG Meeting, Oct. 7, 2019-Oct. 11, 2019, Geneva, (Motion Picture Expert Group or ISO/IEC JTC1/SC29/WG11), No. N18774, Nov. 6, 2019 (Nov. 6, 2019), XP030225506, 305 pages, Retrieved from the Internet:URL:http://phenix.int-evry.fr/mpeg/doc_end_user/documents/128_Geneva/wg11/w18774.zip w18774_Text_DIS_23094-1_draft_final_v3.docx [retrieved on Nov. 6, 2019] p. 243, paragraph 9.3.4.2.6.
Hughes K., et al., "Study of DIS of ISO/IEC 23000-19 Common Media Applications Format for Segmented Media," Draft Feb. 4, 2017, ISO/IEC JTC1/SC29/WG11 MPEG117/N16632, Jan. 2017, Geneva, Switzerland, 131 Pages.
Hughes K., "ISO/IEC 23001-7 3rd Edition—Common Encryption in ISO Base Media File Format Files," 112th MPEG Meeting, Jun. 22, 2015-Jun. 26, 2015, Warsaw, Poland, (Motion Picture Expert Group ISO/IEC JTC1/SC29/WG11), No. N15501, Oct. 16, 2015 (Oct. 16, 2015), XP030022215, 33 pages, (p. 7, paragraph 4.2-p. 9, paragraph p. 14, paragraph 9.1, p. 15 p. 16, paragraph 9.3-p. 17 p. 18, paragraph 9.5.1-p. 24, paragraph 9.6.2 p. 26, paragraph 10.3-p. 28, paragraph 10.4.2).
"Information Technology—Coding—Independent Code Points—Part 2: Video," International Standard, ISO/IEC 23091-2, First Edition, Jul. 2019, 34 pages.
"Information Technology—Dynamic Adaptive Streaming Over HTTP (DASH)—Part 1: Media Presentation Description and Segment Formats," ISO/IEC 23009-1, International Standard, Draft Third Edition, Jan. 9, 2017, 216 pages.
International Search Report and Written Opinion—PCT/US2021/012641—ISA/EPO—dated Apr. 13, 2021 16 Pages.
ISO/IEC 14496-12: "Information Technology—Coding of Audio-Visual Objects—Part 12: ISO Base Media File Format," 5th Edition, Dec. 15, 2015, 248 Pages.
ISO/IEC JTC 1/SC 29 N: "Information Technology—Coding of Audio-Visual Objects—Part 15: Carriage of NAL Unit Structured Video in the ISO Base Media File Format, Amendment 2: Carriage of High Efficiency Video Coding (HEVC)," ISO/IEC 14496-15:2010/PDAM 2, ISO/IEC JTC 1/SC 29/WG 11, May 9, 2012, 27 pages.
ITU-R Recommendation BT.2100-2, "Image Parameter Values for High Dynamic Range Television for Use in Production and International Programme Exchange," Jul. 2018, 16 pages.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Rusanovskyy (QUALCOMM) D., et al., "[EVC] On Enabling Toolset Signalling for EVC," 128th MPEG Meeting, Oct. 7, 2019-Oct. 11, 2019, Geneva, (Motion Picture Expert Group or ISO/IEC JTC1/SC29/WG11), No. m51483, Oct. 9, 2019 (Oct. 9, 2019), XP030221796, 5 pages, Retrieved from the Internet: URL:http://phenix.int-evry.fr/mpeg/doc_end_user/documents/128_Geneva/wg11/m51483-v1-m51483.zip m51483_Toolset_Signaling.docx [retrieved on Oct. 9, 2019] abstractp. 1-p. 3.
Zhao S., et al., "RTP Payload Format for Essential Video Coding (EVC); draft-zhao-avtcore-rtp-evc-00.txt," RTP Payload Format for Essential Video Coding (EVC), draft-zhao-avtcore-rtp-evc-00.txt; Internet-Draft: Network Working Group, Internet Engineering Task Force, IETF; Standard Working Draft, Internet SOC, Dec. 4, 2019 (Dec. 4, 2019), pp. 1-30, XP015136886, Retrieved from the Internet: URL:https://tools.ietf.org/html/draft-zhao-avtcore-rtp-evc-00 [retrieved on Dec. 8, 2019] abstract p. 6, paragraph 1 1.2-p. 7.

* cited by examiner

STORAGE AND DELIVERY OF VIDEO DATA FOR VIDEO CODING

This application claims the benefit of U.S. Provisional Patent Application 62/958,561, filed 8 Jan. 2020, the entire content being incorporated herein by reference.

TECHNICAL FIELD

This disclosure relates to storage and delivery of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for storage and delivery of a bitstream conforming to a video coding standard based on a file format. This disclosure also describes examples of a media format profile for the video coding standard, as well as delivery using a streaming technique. As one example, the video coding standard is the essential video coding (EVC) standard and the file format is the base media file format of the International Organization for Standardization. The base media file format of the International Organization for Standardization is referred to as ISOBMFF. One example of the media format profile is common media application format (CMAF) profile, and one example of the streaming technique is dynamic adaptive streaming over HTTP (DASH). This disclosure may also describe encryption requirements and codecs parameter to be used with Multipurpose Internet Mail Extensions (MIME) type. Although described with respect to EVC, ISOBMFF, CMAF, and DASH, the example techniques should not be considered so limited.

According to one example of this disclosure, a method of processing a video stream or a video file includes receiving a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determining whether to retrieve the bitstream associated with the configuration record; and based on the determination to retrieve the bitstream associated with the configuration record, retrieving the bitstream and outputting the bitstream to a video decoder for decoding.

According to another example of this disclosure, a device for processing a video stream includes a memory configured to store the video stream and one or more processors implemented in the circuitry, coupled to the memory, and configured to receive a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

According to another example of this disclosure, a computer-readable storage medium stores instructions that when executed by one or more processors cause the one or more processors to receive a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

According to another example of this disclosure, an apparatus for processing a video stream or a video file includes means for receiving a configuration record for decoding a bitstream of the video data, wherein the configuration record for the bitstream includes a toolset indication syntax element that includes information identifying, from a set of video decoding tools, tools that are required to decode the bitstream associated with the configuration record; means for determining whether to retrieve the bitstream associated with the configuration record based on the toolset indication syntax element; means for retrieving the bitstream based on the determination to retrieve the bitstream associated with the configuration record; and means for outputting the bitstream to a video decoder for decoding.

The details of one or more examples are set forth in the accompanying drawings and the description below. Other features, objects, and advantages will be apparent from the description, drawings, and claims.

DETAILED DESCRIPTION

Figure 1:
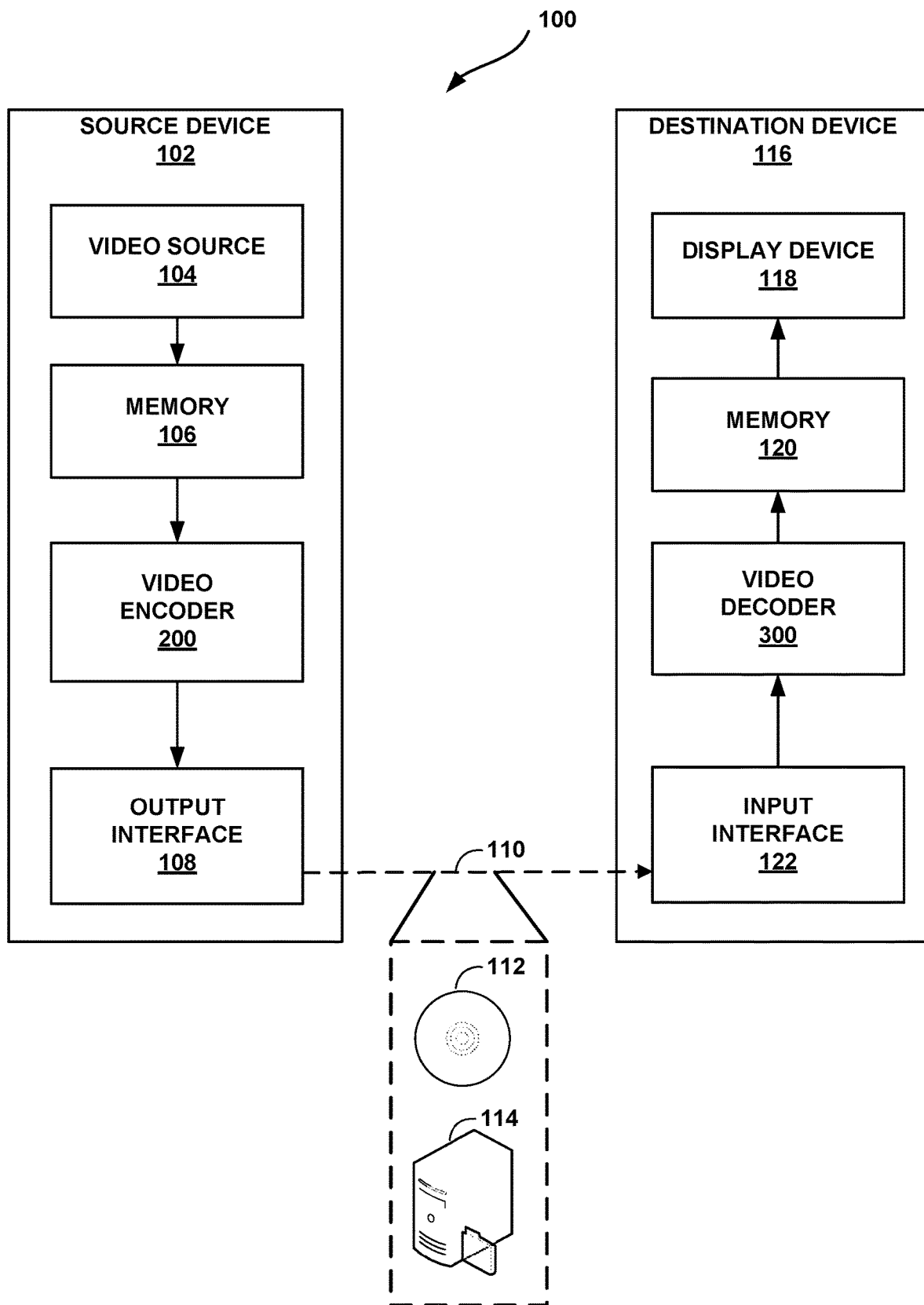
FIG. 1 is a block diagram illustrating an example video encoding and decoding system that may perform the techniques of this disclosure.

The Essential Video Coding (EVC) standard, developed by the ISO/IEC JTC 1/SC 29/WG 11 (MPEG), offers an efficient and low complexity video coding solution. EVC elementary streams are structured as network abstraction layer (NAL) units. Storage of the NAL units in the ISO Base Media File Format (ISOBMFF) follows similar principles as other NAL structured video formats (e.g., High Efficiency Video Coding (HEVC) and/or Versatile Video Coding (VVC) standards).

The storage of EVC elementary streams may be subdivided into two parts: static information that is globally used in the elementary stream and dynamic information that may vary per sample. The sequence parameter set (SPS) and picture parameter set (PPS) may be part of the information that rarely changes and may be considered to be static. A set of flags may be used to indicate if the parameter sets are expected to change in the stream. In such case, a sample grouping is defined that indicates the samples at which the parameter sets do change.

The Adaptation Parameter Set (APS) may be dynamic information that may change on per sample basis. The APS is used to carry the Adaptive Loop Filter (ALF) information. The presence of ALF is signaled through a flag and the samples that carry APS information may belong to the same sample group.

A box may refer to an elementary syntax structure in the ISOBMFF, including a four-character coded box type, the byte count of the box, and the payload. An ISOBMFF file includes a sequence of boxes, and boxes may contain other boxes. A Movie box ("moov") contains the metadata for the continuous media streams present in the file, each one represented in the file as a track.

The metadata for a track may be enclosed in a Track box ("trak"), while the media content of a track may either be enclosed in a Media Data box ("mdat") or directly in a separate file. The media content for tracks includes a sequence of samples, such as audio or video access units. An access unit is, generally, a unit of data including coded media (e.g., picture) data for a common time instance. A sample is an access unit as defined by a particular specification, such as the video coding specifications described herein. A sample entry may provide a description of a corresponding sample.

The ISOBMFF specifies the following types of tracks: a media track, which contains an elementary media stream, a hint track, which either includes media transmission instructions or represents a received packet stream, and a timed metadata track, which comprises time-synchronized metadata.

This disclosure describes a configuration record for a bitstream of video data that includes a toolset indication syntax element that includes information identifying tools that are required to decode the bitstream associated with the configuration record. This disclosure also describes techniques for including a multipurpose internet mail extensions (MIME) type parameter, in for example an HTTP transmission, that includes a key value pair. The key may indicate that the MIME type identifies the video decoding tools, and the value may identify the tools that are required to decode the bitstream. Typically, a tool may be considered to be required if the tool is enabled in at least one parameter set for the media stream. By using such a toolset indication syntax element and MIME type, the techniques of this disclosure may advantageously enable a video processing device to determine if the a video decoder of the video processing device can decode a file without having to parse a majority of the file.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, source device 102 and destination device 116 may be configured to apply the techniques for storage and delivery of bitstreams conforming to a video coding standard based on a file format (e.g., Essential Video Coding (EVC) elementary bitstream based on the ISO Base Media File Format (ISOBMFF)). The disclosure also describes a media profile (e.g., common media application format (CMAF media profile for EVC), describes the delivery using Dynamic Adaptive Streaming over HTTP (DASH), describes encryption requirements, and describes codec parameters to be used with Multipurpose Internet Mail Extensions (MIME) type that may be utilized by video encoder 200 and video decoder 300. Thus, source device 102 represents an example of a client device configured to perform video encoding and transmission, while destination device 116 represents an example of a destination device configured to receive and decode encoded video. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for storage and delivery of bitstreams conforming to a video coding standard based on a file format (e.g., EVC elementary bitstream based on ISOBMFF). The disclosure also describes a media profile (e.g., CMAF media profile for EVC), describes the delivery using DASH, describes encryption requirements, and describes codec parameters to be used with MIME type that may be utilized by video encoder 200 and video decoder 300. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). Video encoder 200 and video decoder 300 may operate according the EVC standard developed by ISO/IEC JTC 1/SC 29/WG 11 (MPEG). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

Various video coding standards define various blocks, sometimes referred to as coding units (CUs), prediction units (PUs), and transform units (TUs). A video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, a residual quadtree (RQT) represents partitioning of Tus, and PUs represent inter-prediction data, while TUs represent residual data. CUs that are intra-predicted include intra-prediction information, such as an intra-mode indication.

As another example, video encoder 200 and video decoder 300 may be configured to operate according to JEM, VVC, EVC, or any other such standard. A video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some video coding standards also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. For example, video encoder 200 may utilize sixty-seven or some other number of intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The following describes example techniques of EVC. In some examples, EVC techniques may be similar to those of VVC and/or HEVC (e.g., such as block-based coding techniques).

An EVC sample contains an access unit as defined in clause 3.1 of ISO/IEC 23094-1: Information technology—General video coding—Part 1: Essential video coding. In EVC, there may be a canonical order for a bitstream to conform to EVC and there may be certain restrictions. The canonical stream format is an EVC elementary stream that satisfies the following conditions in addition to the general conditions in ISO/IEC 14496-15: Information technology—Coding of audio-visual objects—Part 15: Advanced Video Coding (AVC) file format, section 4.3.2:

a. Access unit delimiter NAL units: The constraints obeyed by access unit delimiter NAL units are defined in ISO/IEC 23094-1.
   b. SPSs and PPSs: An SPS or PPS to be used in a picture may be (and in some examples, must be) sent prior to the sample containing that picture or in the sample for that picture. At least the SPS and PPS with id equal to 0 may be stored in the sample entry of the track that contains the EVC elementary stream.
   c. APSs: An APS to be used in a slice may be (an in some examples, must be) sent prior to the VCL NAL unit containing that slice. The APSs may be stored in the sample entry and/or in the samples.
   d. SEI messages: SEI messages of declarative nature may be stored in the sample entry; there is no prescription about removing such SEI messages from the samples.
   e. Filler data. Video data is naturally represented as variable bit rate in the file format and should be filled for transmission if needed.

The removal or addition of Filler Data NAL units, start codes, SEI messages or Filler Data SEI messages can change the bitstream characteristics with respect to conformance with the hypothetical reference decoder (HRD) when operating the HRD in constant bit rate (CBR) mode as specified in ISO/IEC 23094-1, Annex C.

The following is the EVC decoder configuration record and description. Video decoder 300 may be configured in accordance with the EVC decoder configuration, in some examples. As part of describing the EVC decoder configuration description, the following specifies the decoder configuration information for ISO/IEC 23094-1 video content.

This record contains a version field. File format parsers (e.g., readers) may (e.g., shall) not attempt to decode this record or the streams to which it applies if the version number is unrecognized.

Compatible extensions to this record may extend it and may not change the configuration version code. Readers may ignore unrecognized data beyond the definition of the data for which the readers are configured to parse.

The values for profile_idc, level_idc, toolset_idc, chroma_format_idc, pic_width_in_luma_samples, pic_height_in_luma_samples, bit_depth_luma_minus8, and bit_depth_chroma_minus8 may be (and in some examples, shall be) valid for all parameter sets that are activated when the stream is decoded (referred to as "all the parameter sets"). Specifically, the following restrictions may apply:

a. The profile indication profile_idc may (e.g., shall) indicate a profile to which the stream associated with this configuration record conforms. If the SPSs are marked with different profiles, then the stream could need examination to determine which profile, if any, the entire stream conforms to. If the entire stream is not examined, or the examination reveals that there is no profile to which the entire stream conforms, then the entire stream may be (e.g., shall be) split into two or more sub-streams with separate configuration records in which these rules can be met.

b. The level indication level_idc may (e.g., shall) indicate a level of capability equal to or greater than the highest level indicated in all the parameter sets of this configuration record.

c. The pic_width_in_luma_samples and pic_height_in_luma_samples may (e.g., shall) contain the highest values of all parameter sets of this configuration record.

d. The toolset indication toolset_idc may (e.g., shall) signal all tools that are required to decode the stream associated with this configuration record. The tools flags may (e.g., shall) comply with the conformance requirements as provided in table A.6 (reproduced below) of ISO/IEC 23094-1 and may (e.g., shall) be identical with the toolset_idc field that is signaled in the SPS.

e. The value of chroma_format_idc in all the parameter sets may (e.g., shall) be identical.

f. The value of bit_depth_luma_minus8 in all the parameter sets may (e.g., shall) be identical.

g. The value of bit_depth_chroma_minus8 in all the parameter sets may (e.g., shall) be identical.

Explicit indication is provided in the EVC Decoder Configuration Record about the chroma format and bit depth used by the EVC video elementary stream. Each type of such information may (e.g., shall) be identical in all parameter sets, if present, in a single EVC configuration record. If two sequences differ in any type of such information, two different EVC sample entries may (e.g., shall) be used.

There is a set of arrays to carry initialization NAL units. The NAL unit types may be restricted to indicate SPS, PPS, APS, and SEI NAL units only. NAL unit types that are reserved in ISO/IEC 23094-1 and in this specification may be defined, and NAL units with unrecognized NAL unit types may be ignored. This 'tolerant' behavior (e.g., ignoring of unrecognized NAL unit types) may be designed so that errors are not raised, allowing the possibility of backwards-compatible extensions to these arrays in future specifications.

The length field may be used in each sample to indicate the length of its contained NAL units as well as the parameter sets, if stored in the sample entry. In some examples, the arrays are in the order of SPS, PPS, APS, SEI.

Table A.6 of ISO/IEC 23094-1 is as follows:

| tools_idc binIdx | SPS tool flag | Conformance requirement |
|---|---|---|
| 0 | sps_btt_flag | sps_btt_flag <= toolset_idc_h & 0x1 && sps_btt_flag >= toolset_idc_l & 0x1 |
| 1 | sps_suco_flag | sps_suco_flag <= ( toolset_idc_h & 0x2 ) >> 1 && sps_suco_flag >= ( toolset_idc_l & 0x2 ) >> 1 |
| 2 | sps_amvr_flag | sps_amvr_flag <= ( toolset_idc_h & 0x4 ) >> 2 && sps_amvr_flag >= ( toolset_idc_l & 0x4 ) >> 2 |
| 3 | sps_mmvd_flag | sps_mmvd_flag <= ( toolset_idc_h & 0x8 ) >> 3 && sps_mmvd_flag >= ( toolset_idc_l & 0x8 ) >> 3 |
| 4 | sps_affine_flag | sps_affine_flag <= ( toolset_idc_h & 0x10 ) >> 4 && sps_affine_flag >= ( toolset_idc_l & 0x10 ) >> 4 |
| 5 | sps_dmvr_flag | sps_dmvr_flag <= ( toolset_idc_h & 0x20 ) >> 5 && sps_dmvr_flag >= ( toolset_idc_l & 0x20 ) >> 5 |
| 6 | sps_alf_flag | sps_alf_flag <= ( toolset_idc_h & 0x40 ) >> 6 && sps_alf_flag >= ( toolset_idc_l & 0x40) >> 6 |
| 7 | sps_admvp_flag | sps_admvp_flag <= ( toolset_idc_h & 0x80) >> 7 && sps_admvp_flag >= ( toolset_idc_l & 0x80 ) >> 7 |
| 8 | sps_eipd_flag | sps_eipd_flag <= ( toolset_idc_h & 0x100 ) >> 8 && sps_eipd_flag >= ( toolset_idc_l & 0x100 ) >> 8 |
| 9 | sps_adcc_flag | sps_adcc_flag <= ( toolset_idc_h & 0x200 ) >> 9 && sps_adcc_flag >= ( toolset_idc_l & 0x200 ) >> 9 |
| 10 | sps_ibc_flag | sps_ibc_flag <= ( toolset_idc_h & 0x400 ) >> 10 && sps_ibc_flag >= ( toolset_idc_l & 0x400 ) >> 10 |
| 11 | sps_iqt_flag | sps_iqt_flag <= ( toolset_idc_h & 0x800 ) >> 11 && sps_iqt_flag >= ( toolset_idc_l & 0x800 ) >> 11 |
| 12 | sps_htdf_flag | sps_htdf_flag <= ( toolset_idc_h & 0x1000 ) >> 12 && |

-continued

| tools_idc binIdx | SPS tool flag | Conformance requirement |
|---|---|---|
| | | sps_htdf_flag >= ( toolset_idc_1 & 0x1000 ) >> 12 |
| 13 | sps_addb_flag | sps_addb_flag <= ( toolset_idc_h & 0x2000) >> 13 && |
| | | sps_addb_flag >= ( toolset_idc_1 & 0x2000 ) >> 13 |
| 14 | sps_cm_init_flag | sps_cm_init_flag <= ( toolset_idc_h & 0x4000 ) >> 14 && |
| | | sps_cm_init_flag >= ( toolset_idc_1 & 0x4000 ) >> 14 |
| 15 | sps_ats_flag | sps_ats_flag <= ( toolset_idc_h & 0x8000 ) >> 15 && |
| | | sps_ats_flag >= ( toolset_idc_1 & 0x8000 ) >> 15 |
| 16 | sps_rpl_flag | sps_rpl_flag <= ( toolset_idc_h & 0x10000 ) >> 16 && |
| | | sps_rpl_flag >= ( toolset_idc_1 & 0x10000 ) >> 16 |
| 17 | sps_pocs_flag | sps_pocs_flag <= ( toolset_idc_h & 0x20000 ) >> 17 && |
| | | sps_pocs_flag >= ( toolset_idc_1 & 0x20000 ) >> 17 |
| 18 | sps_dquant_flag | sps_dquant_flag <= ( toolset_idc_h & 0x40000 ) >> 18 && |
| | | sps_dquant_flag >= ( toolset_idc_1 & 0x40000 ) >> 18 |
| 19 | sps_dra_flag | sps_dra_flag <= ( toolset_idc_h & 0x80000 ) >> 19 && |
| | | sps_dra_flag >= ( toolset_idc_1 & 0x80000 ) >> 19 |
| 20 | sps_hmvp_flag | sps_hmvp_flag <= ( toolset_idc_h & 0x100000 ) >> 20 && |
| | | sps_hmvp_flag >= ( toolset_idc_1 & 0x100000 ) >> 20 |
| 21 ... 31 | Reserved for future use by ISO/IEC. | Reserved for future use by ISO/IEC. |

The following describes syntax used by video encoder 200 and video decoder 300.

```
aligned(8) class EVCDecoderConfigurationRecord {
    unsigned int(8) configurationVersion = 1;
    unsigned int(8) profile_idc;
    unsigned int(8) level_idc;
    unsigned int(32) toolset_idc;
    unsigned int(2) chroma_format_idc;
    unsigned int(3) bit_depth_luma_minus8;
    unsigned int(3) bit_depth_chroma_minus8;
    unsigned int(32) pic_width_in_luma_samples;
    unsigned int(32) pic_height_in_luma_samples;
    unsidned int(5) reserved = '00000'b;
    unsigned int(1) sps_in_stream;
    unsigned int(1) pps_in_stream;
    unsigned int(1) aps_in_stream;
    unsigned int(8) numOfArrays;
    for (j=0; j < numOfArrays; j++) {
        bit(2) reserved = '00'b;
        unsigned int(6) NAL_unit_type;
        unsigned int(16) numNalus;
        for (i=0; i< numNalus; i++) {
            unsigned int(16) nalUnitLength;
            bit(8*nalUnitLength) nalUnit;
        }
    }
}
```

The following description illustrates semantics for defining terms in the above syntax. The syntax elements profile_idc, level_idc, toolset_idc, chroma_format_idc, toolset_idc, bit_depth_luma_minus8 and bit_depth_chroma_minus8 contain the matching values for the fields in the PPS for all parameter sets of the configuration record. The notation "(32)" indicates that the syntax element toolset_idc is 32 bits. These 32 bits may include one-bit flags that each correspond to a specific tool, or in some instances, multiple bits of the 32 bits may, for example, correspond to combinations of tools or the selection of tools from sets of tools.

The syntax elements pic_width_in_luma_samples and pic_height_in_luma_samples contain the largest values for the fields in all SPS of this configuration record when the value of the sps_in_stream field is '0'. These syntax elements may contain the largest values for the fields in all SPS of this configuration record and all SPS in the stream when the value of the sps_in_stream field is '1'. The value '0' may (e.g., shall) be used if the largest value of these fields in the SPS for all the parameter sets in this record is not indicated through this field when the value of the sps_in_stream field is '0' or the value of these fields in the SPS in the stream has the value larger than the largest value of the field in this record when the value of the sps_in_stream field is '1'.

The syntax element sps_in_stream indicates that the stream may contain additional SPS, that are not included in the array of NAL units of this configuration record. The syntax element pps_in_stream indicates that the stream may contain additional PPS, that are not included in the array of NAL units of this configuration record. The syntax element aps_in_stream indicates that the stream may contain additional APS, that are not included in the array of NAL units of this configuration record.

The syntax element numArrays indicates the number of arrays of NAL units of the indicated type(s). The syntax element NAL_unit_type indicates the type of the NAL units in the following array (which may (e.g., shall) be all of that type). NAL_unit_type takes a value as defined in ISO/IEC 23094-1, and may be restricted to take one of the values indicating a SPS, PPS, APS, or SEI NAL unit.

The syntax element numNalus indicates the number of NAL units of the indicated type included in the configuration record for the stream to which this configuration record applies. The syntax element nalUnitLength indicates the length in bytes of the NAL unit. The syntax element nalUnit contains an SPS, PPS, APS or a SEI NAL unit, as specified in ISO/IEC 23094-1.

Video files in accordance with the ISO base media file format and extensions thereof store data in a series of objects, referred to as "boxes." The following describes the ISO base media file format, including EVC video stream definition and sample entry name and format.

| | | |
|---|---|---|
| a. | Sample Entry and Box Types: | 'evc1', 'evcC' |
| b. | Container: | Sample Table Box ('stbl') |
| c. | Mandatory: | An 'evc1' sample entry is mandatory |
| d. | Quantity: | One or more sample entries may be present |

An EVC visual sample entry may (e.g., shall) contain an EVC Configuration Box, as defined below. This includes an EVCDecoderConfigurationRecord.

An optional BitRateBox may be present in the EVC visual sample entry to signal the bit rate information of the EVC video stream.

Multiple sample entries may be used, as permitted by the ISO Base Media File Format specification, to indicate sections of video that use different configurations or parameter sets.

When the sample entry name is 'evc1', the stream to which this sample entry applies may (e.g., shall) be a compliant EVC stream as viewed by an EVC decoder (e.g., video decoder 300) operating under the configuration (including profile, level, and toolset) given in the EVCConfigurationBox.

The 'evc1' sample entry allows for both storage of the parameter sets in the sample entry and in the stream. The sps_in_stream, pps_in_stream, and aps_in_stream when set to 0, indicate that the array of the NAL units of the corresponding type is complete.

The following is an example set of syntax for a configuration box for the file format.

```
class EVCConfigurationBox extends Box('evcC') {
    EVCDecoderConfigurationRecord( ) EVCConfig;
}
class EVCSampleEntry( ) extends VisualSampleEntry ('evc1'){
    EVCConfigurationBox      config;
    MPEG4ExtensionDescriptorsBox ( ); // optional
}
```

The following is an example set of semantics for the syntax described above.

Compressorname in the base class VisualSampleEntry indicates the name of the compressor used with the value "\012EVC Coding" being recommended (\012 is 10, the length of the string in bytes). EVCDecoderConfigurationRecord is defined in section 5.3.3 (e.g., such as possibly but not limited to ISO/IEC 23904-1).

The following describes parameter sets. As an overview, at least the initial SPS and PPS with ids equal to 0 may (e.g., shall) be carried in the sample entry. If sps_in_stream and/or pps_in_stream is set to '1', additional SPSs and/or PPSs may be present in-band in the stream.

Samples that carry a parameter set may (e.g., shall) belong to a sample group that corresponds to the type of that parameter set. Three sample group_type 'pss1' is defined in this specification. A further grouping type parameter is used to differentiate between SPS, PPS, and APSs, where 'sps1' identifies a sample group of samples that carry an SPS, 'pps1' identifies a sample group of samples that carry a PPS, and 'aps1' identifies a sample group of samples that carry an APS.

The following describes Parameter Set Sample Group Entry including definitions.

| | | |
|---|---|---|
| a. | Group Types: | 'pss1' |
| b. | Container: | Sample Group Description Box ('sgpd') |
| c. | Mandatory: | No |
| d. | Quantity: | Zero or more |

A Parameter Set sample group identifies samples that contain a parameter set of type SPS, PPS, or APS. The grouping_type_parameter further identifies the type of the parameter set and can take a value of 'sps1', 'pps1', or 'aps1'.

The following describes some syntax for parameter set sample group entry.

```
class PSSSampleEntry( ) extends VisualSampleGroupEntry ('pss1')
{
}
```

The following describes sync sample. A sync sample in 'evc1' tracks may (e.g., shall) contain VCL NAL units indicating that the coded picture with nuh_temporal_id equal to 0 in the sample is an Instantaneous Decoding Refresh (IDR) picture.

Table 1 indicates the mapping between EVC VCL NAL unit types, ISOBMFF sync sample status and SAP types as documented in ISOBMFF.

TABLE 1

Mapping of sync sample status and SAP types to NAL unit type

| NAL Unit Type | ISOBMFF sync sample status | DASH SAP type |
|---|---|---|
| IDR_N_LP | true | 1 |

The following is definition of a sub-sample for EVC. For the use of the SubSampleInformationBox (8.7.7 of ISO/IEC 14496-12) in a EVC stream, a sub-sample is defined on the basis of the value of the flags field of the sub-sample information box as specified below. The presence of this box is optional; however, if present in a track containing EVC data, the 'codec_specific_parameters' field in the box may (e.g., shall) have the semantics defined here.

Flags specify the type of sub-sample information given in this box as follows:
 a. 0: NAL-unit-based sub-samples: A sub-sample contains one or more contiguous NAL units.
 b. 1: Tile-based sub-samples: A sub-sample contains the VCL NAL units with all CTUs of one tile together with any associated non-VCL NAL units, if any.
 c. 2: Slice-based sub-samples; A sub-sample contains one slice (i.e., one VCL NAL unit) and the associated non-VCL NAL units, if any.
 d. Other values of flags are reserved.

The subsample_priority field may (e.g., shall) be set to a value in accordance with the specification of this field in ISO/IEC 14496-12.

The discardable field may (e.g., shall) be set to 1 only if this sample would still be decodable if this sub-sample is discarded (e.g. the sub-sample consists of an SEI NAL unit).

When the first byte of a NAL unit is included in a sub-sample, the preceding length field may (e.g., shall) also be included in the same sub-sample.

The codec_specific_parameters field of the SubSampleInformationBox is defined for EVC as follows:

```
if (flags == 1) {
    unsigned int(16) tile_col_idx;
    unsigned int(16) tile_row_idx;
}
``` tile_col_idx for sub-samples based on tiles, this parameter indicates the 0-based index of the tile column that contains the tile of this sub-sample.

tile_row_idx for sub-samples based on tiles, this parameter indicates the 0-based index of the tile row that contains the tile of this sub-sample.

The following describes CMAF media profile. ISO/IEC 23000-19 Common Media Application Format (CMAF) defines structural constraints on ISOBMFF files additional to ISO/IEC 14496-12 for the purpose of, for example, adaptive streaming or delivery of encrypted files. Conformance to these structural constraints is signaled by the presence of a CMAF defined structural brand in the FileTypeBox.

If an ISO BMFF Track uses the brand 'cevc', it is called a CMAF EVC Track and the following constraints, defining the CMAF Media Profile for EVC, apply:
  a. it may (e.g., shall) use the 'evc1' sample entry as defined in clause 6.3 of ISO/IEC 23094-1.
  b. the track may (e.g., shall) conform to the general CMAF track constraints in ISO/IEC 23000-19, clause 7
  c. the track may (e.g., shall) conform to the general CMAF video track constraints in ISO/IEC 23000-19, clause 9

If EVC media is provided in a CMAF Switching Set, then
  a. every CMAF track in the CMAF Switching Set may (e.g., shall) conform a CMAF EVC Track
  b. the CMAF Switching Set may (e.g., shall) conform to the general CMAF Switching Set constraints in ISO/IEC 23000-19, clause 7, and
  c. the general CMAF video track Switching Set constraints defined in ISO/IEC 23000-19, clause 9.

A CMAF Switching Set following these requirements is defined as the CMAF EVC Media Profile 'cevc'. The encryption of CMAF EVC Tracks and CMAF EVC Switching Sets may (e.g., shall) be compliant with ISO/IEC 23000-19 clause 8, using either the 'cenc' AES-CTR scheme or the 'cbcs' AES-CBC subsample pattern encryption scheme, as specified in ISO/IEC 23001-7, clause 10.1 and 10.4, respectively.

Furthermore, of the 'cbcs' mode of Common Encryption uses pattern encryption as defined in clause 9.6 of ISO/IEC 23001-7 is used, then a Pattern Block length of 10 and an encrypt:skip pattern of 1:9 may (e.g., shall) be applied (e.g., as described in clause 10.4 of ISO/IEC 23001-7).

The following describes mapping to DASH delivery. If EVC encoded media is provided in a DASH Media Presentation in an Adaptation Set, then the Adaptation Set may (e.g., shall) conform to the DASH profile for CMAF as defined in ISO/IEC 23009-1. The following parameters may (e.g., shall) be present on Adaptation Set level and set:
  a. @codecs is set according to Annex A
  b. @mimeType is set to be compatible with "video/mp4 profiles='cevc'"

The following is description for sub-parameters for the MIME type 'codes' parameter. DASH and other applications require defined values for the Codecs parameter specified in IETF RFC 6381 for ISO BMFF Media tracks. The codecs parameter string for the EVC codec is as follows: <sample entry 4CC>.<key1><value1>.<key2><value2> . . . <keyN><valueN>

Keys are defined as 4CCs. An initial set of keys and the associated value pairs are defined in Table 2. Additional keys may be specified as 4CCs. In some examples, keys are aligned with ISO/IEC 23091-2.

If a specific key is not provided, then either a specified default value applies, or if not announced (n/a), the value for the key is unknown.

TABLE 2

Definition of Initial Set of Keys and Values defined for EVC

| Key | Key Definition | Value | Default Value |
|---|---|---|---|
| 'vprf' | Defines the video profile | profile_idc | ? |
| 'vlev' | Defines the video level | level_idc | ? |
| 'vtoo' | Defines the toolset | toolset_idc in hex decimal | 0000 |
| 'vbit' | Defines the video bit depth for luma and chroma | The first digit is the luma bit depth −8 and the second one is the chroma bit depth - 8 | 00 |
| 'vcss' | Defines the chroma subsampling | The first digit is the first digit, the second and the third | 420 |
| 'vcpr' | Defines colour primaries (ColourPrimaries) as defined in ISO/IEC 23091-2. | Defines colour primaries (ColourPrimaries) values as defined in ISO/IEC23091-2. Value is a 2 digit decimal with a possible preceding 0. | 01 |
| 'vtrc' | Defines transfer characteristics (TransferCharacteristics) as defined in ISO/IEC23091-2. | Defines transfer characteristics (TransferCharacteristics) values as defined in ISO/IEC23091-2. Value is a 2 digit decimal with a possible preceding 0. | 01 |
| 'vmac' | Defines matrix coefficients (MatrixCoefficients) as defined in ISO/IEC23091-2. | Defines matrix coefficients (MatrixCoefficients) values as defined in ISO/IEC23091-2. Value is a 2 digit decimal with a possible preceding 0. | 01 |
| 'vfrf' | Defines VideoFullRangeFlag as defined in ISO/IEC23091-2. | Defines VideoFullRangeFlag as defined in ISO/IEC23091-2. | 0 |

TABLE 2-continued

Definition of Initial Set of Keys and Values defined for EVC

| Key | Key Definition | Value | Default Value |
|---|---|---|---|
| 'vfpq' | Defines video frame packing type (VideoFramePackingType) as defined in ISO/IEC23091-2 together with the QuincunxSamplingFlag. | Defines video frame packing type (VideoFramePackingType) values as defined in ISO/IEC23091-2. Value is a 2 digit decimal with the first one being the QuincunxSamplingFlag and the second digit the VideoFramePackingType. | If not present, then no frame packing is used. |
| 'vpci' | Defines Packed content interpretation type (PackedContentInterpretationType) as defined in ISO/IEC23091-2. | Packed content interpretation type (PackedContentInterpretationType) as defined in ISO/IEC23091-2. Value is a 1 digit. | If not present, then no packed content is used. |
| 'vsar' | Defines Sample aspect ratio indicator (SampleAspectRatio) as defined in ISO/IEC23091-2. | Defines Sample aspect ratio indicator (SampleAspectRatio) values as defined in ISO/IEC23091-2. Value is a 2 digit decimal with a possible preceding 0. | 01 |

For example, codecs="evc1.vprf3.vlev51.vtoo03FF.vbit20.vcss420.vcpr09.vtrc16.vmac09.vsar01" represents EVC Main Profile, level 5.1, with 4:2:0 chroma subsampling co-located with (0, 0) luma sample, a restricted tool set, ITU-R BT.2100 color primaries, ITU-R BT.2100 PQ transfer characteristics, ITU-R BT.2100 YCbCr color matrix and sample aspect ratio 1:1. All keys in Table 2 may be (e.g., must be) recognized, if the evc1 sample entry is recognized. If a key is not recognized, the key value pair is ignored. In some examples, other keys may be defined, for example only 2CCs.

The key-value pair of 'vtoo' and toolset_idc conveys the same information as the toolset_idc syntax element in the decoder configuration record, but represents a different manner of exposing this information to a video processing device.

In accordance with the techniques described above, destination device 116 may be configured to receive a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and output the bitstream to a video decoder for decoding. Destination device 116 may additionally or alternatively receive a MIME type parameter that includes a key value pair, wherein the key indicates that the MIME type identifies the video decoding tools, and the value identifies, from the video decoding tools, the tools that are required to decode the bitstream. The bitstream of video data may include one or more parameter sets, and each of the tools identified in the configuration record as being required to decode the bitstream may be enabled in at least one of the one or more parameter sets.

The toolset indication syntax element is signaled in a configuration box of file format information. The toolset indication syntax element that includes information identifying the tools that are required to decode the bitstream associated with the configuration record may identify all tools that are required to decode the bitstream associated with the configuration record. The toolset indication syntax element may be an unsigned 32-bit integer value, with each bit of the unsigned 32-bit integer value corresponding to a unique tool for decoding the bitstream.

The configuration record may be formatted in accordance with the essential EVC standard. The configuration record for the bitstream may include a profile syntax element and/or a level syntax element before the toolset indication syntax element. The configuration record for the bitstream may include a chroma format syntax element after the toolset indication syntax element.

Figure 2A:
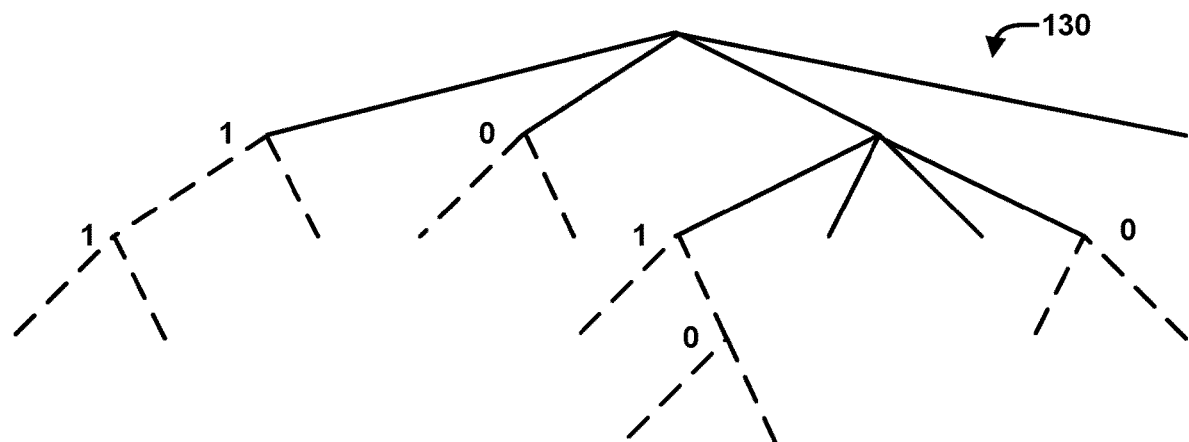
FIGS. 2A and 2B are conceptual diagrams illustrating an example quadtree binary tree (QTBT) structure, and a corresponding coding tree unit (CTU).
Figure 2B:
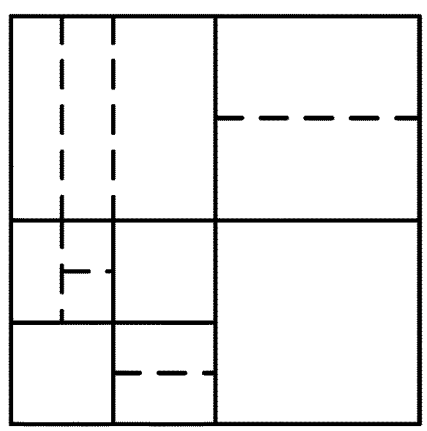

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
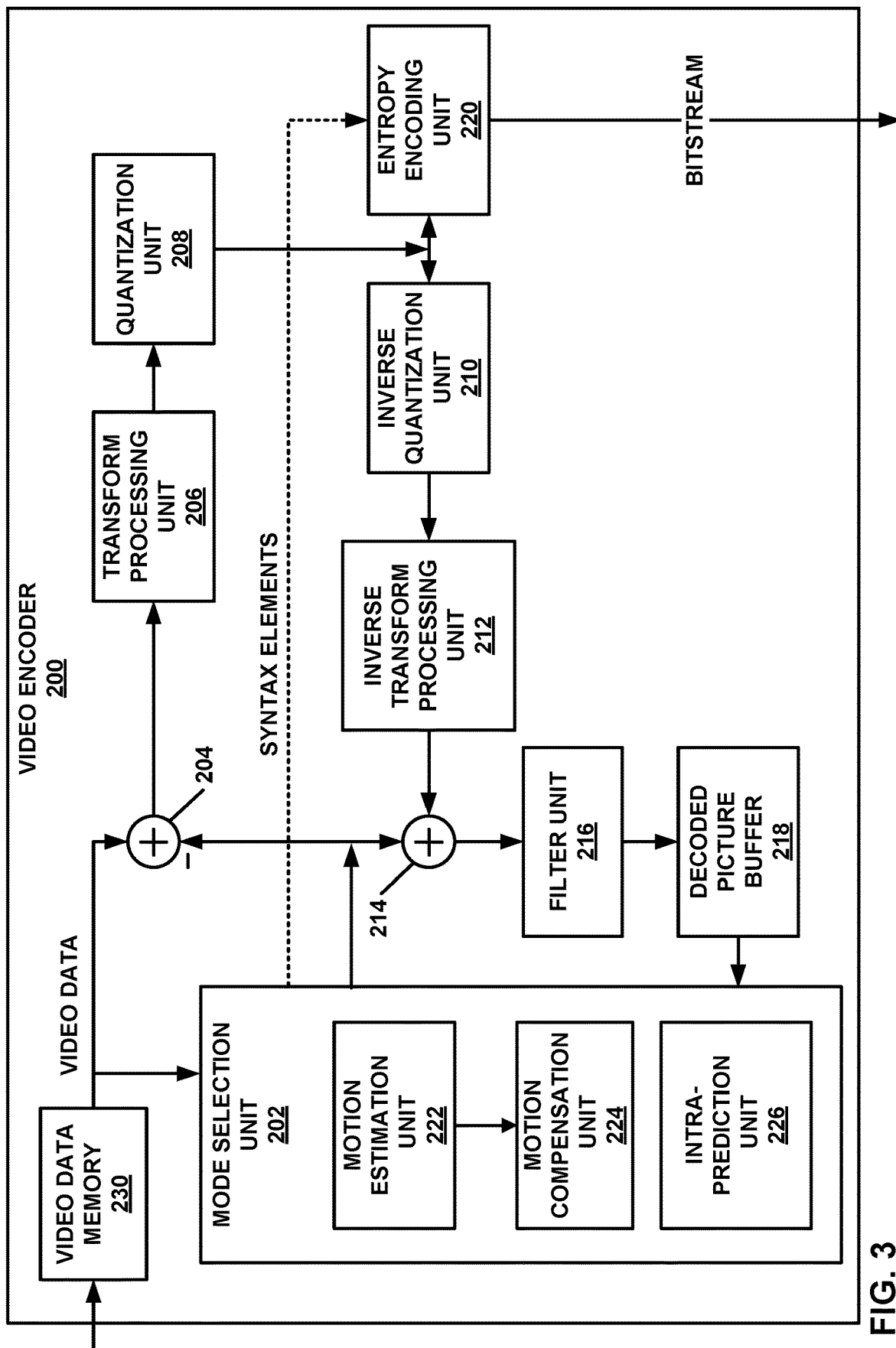
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of JEM, EVC, VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to perform one or more example techniques described in this disclosure.

In some examples, a source device may be configured to receive the output from video encoder 200 and determine (e.g., generate) a configuration record for a bitstream encapsulating video data encoded by video encoder 200 in accordance with the essential video coding (EVC) standard that includes information for decoding the bitstream. The configuration record may include a toolset indication syntax element (e.g., toolset_idc). The configuration record may be provided at a file format level, e.g., as file format level data, or at a level that encapsulates video coding layer (VCL) level encoded media data. For example, as discussed herein, the configuration record may be included in a configuration box in a media file, where the configuration box is separate from a movie fragment box or other box that includes actual encoded media data. In some examples, the toolset indication syntax element may include information of all tools that are required to decode the bitstream associated with the configuration record. The toolset indication syntax element may indicate tools that match another toolset_idc field that is signaled in a sequence parameter set (SPS).

In some examples, the toolset indication syntax element may be considered as including tools that are required to play the file in the sample entry which is part of the coded parameters. To enable toolset indication syntax element, a coding scheme for the coded parameters in the MIME type may be utilized.

Figure 4:
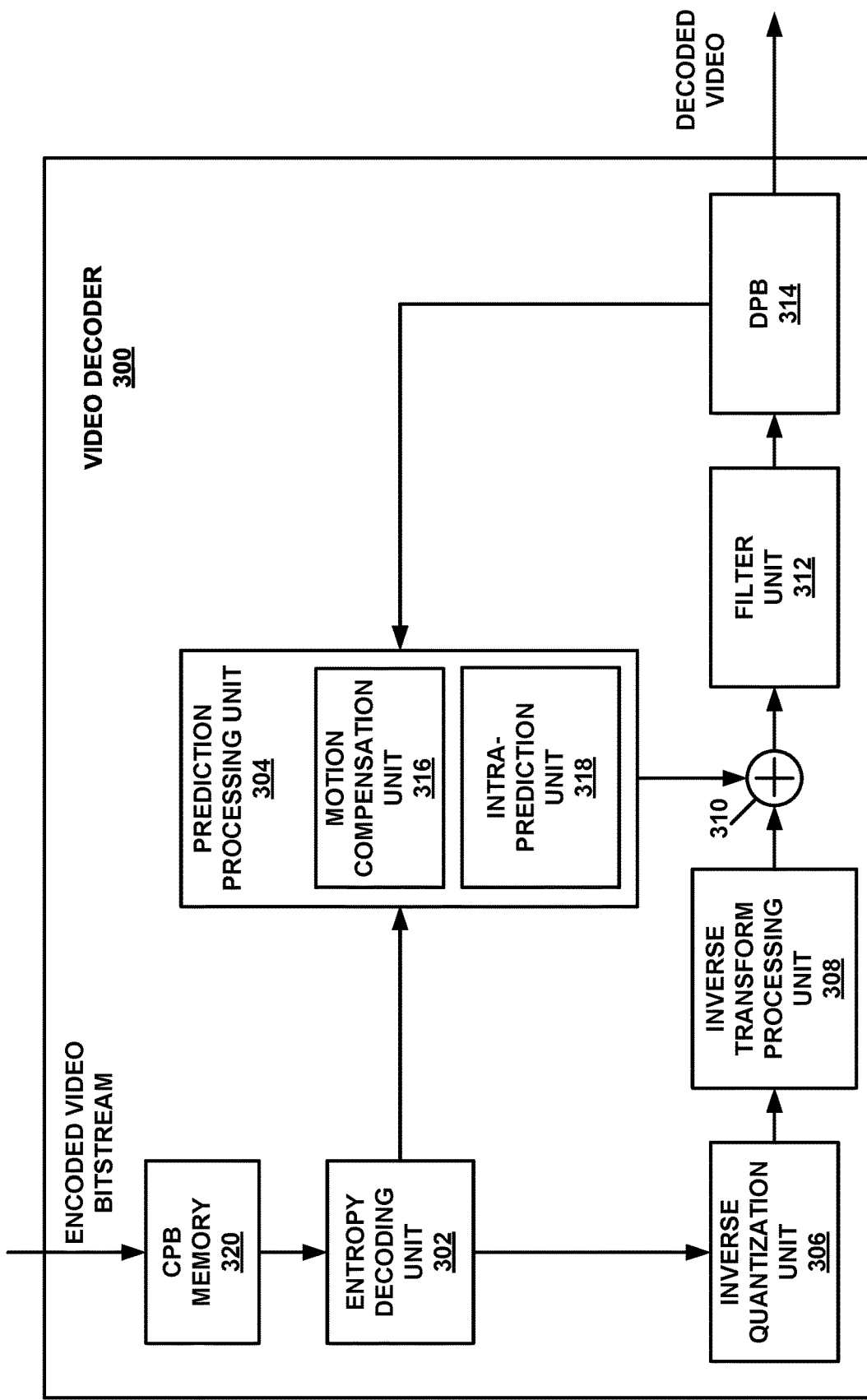
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, EVC, VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform example techniques described in this disclosure.

In some examples, a client device may be configured to receive a configuration record for decoding a bitstream of video data in accordance with the essential video coding (EVC) standard. The configuration record may include a toolset indication syntax element (e.g., toolset_idc). In some examples, the toolset indication syntax element may include information of all tools that are required to decode the bitstream associated with the configuration record. The toolset indication syntax element of the configuration record may match a toolset indication syntax element signaled in a sequence parameter set (SPS). Based on the toolset indication syntax element, the client device may determine whether to retrieve the bitstream associated with the configuration record. Based on the determination to retrieve the bitstream associated with the configuration record, the client device may retrieve the bitstream and output the bitstream to video decoder 300 for decoding.

In some examples, the toolset indication syntax element may be considered as including tools that are required to play the file in the sample entry which is part of the coded parameters. To enable toolset indication syntax element, a coding scheme for the coded parameters in the MIME type may be utilized.

Figure 5:
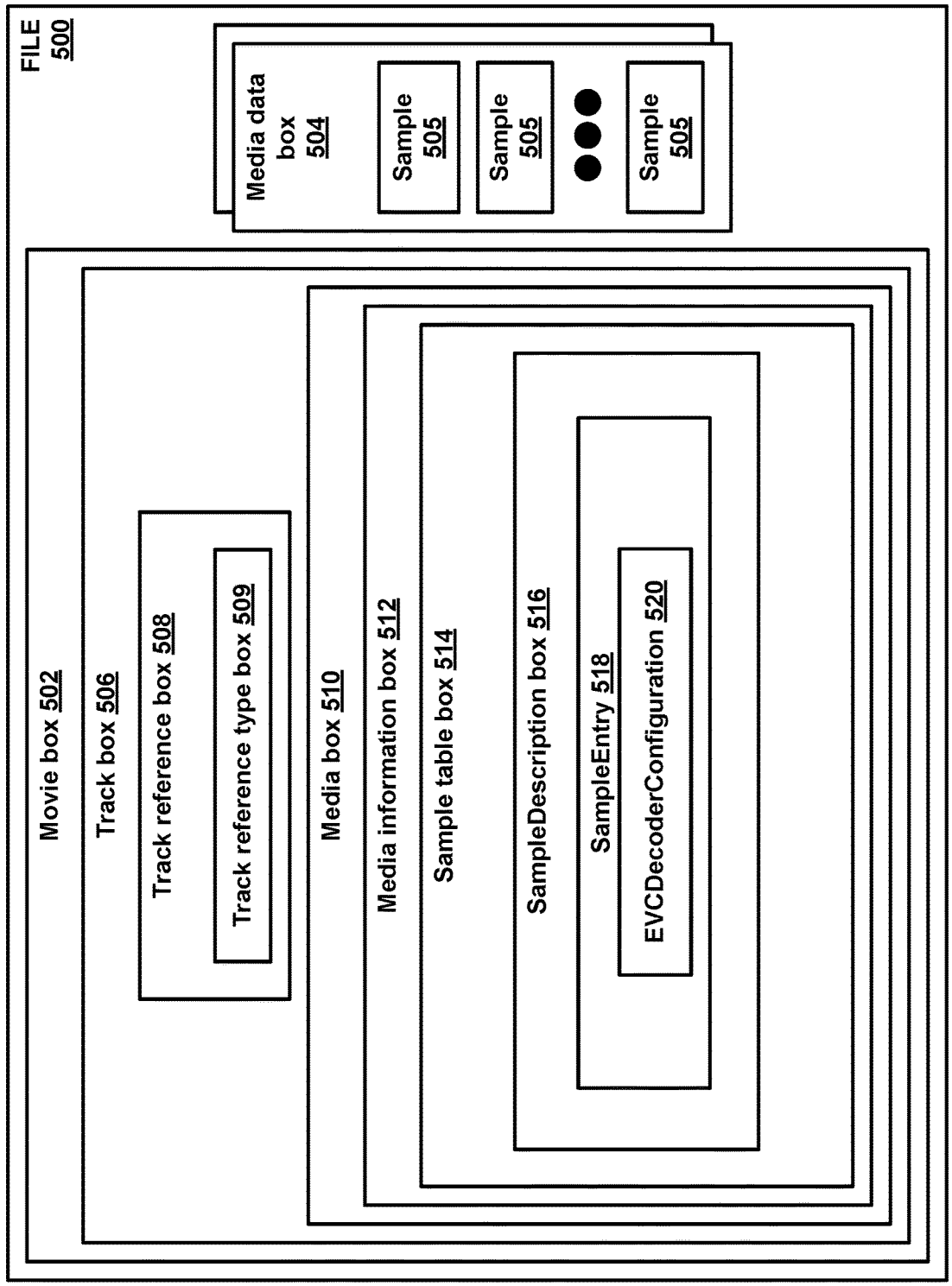
FIG. 5 is a conceptual diagram illustrating an example structure of a file, in accordance with one or more techniques of this disclosure.

FIG. 5 is a conceptual diagram illustrating an example structure of a file 500, in accordance with one or more techniques of this disclosure. In the example of FIG. 5, file 500 includes a movie box 502 and a plurality of media data boxes 504. Although illustrated in the example of FIG. 5 as being in the same file, in other examples, movie box 502 and media data boxes 504 may be in separate files. As indicated above, a box may be an object-oriented building block defined by a unique type identifier and length. For instance, a box may be the elementary syntax structure in the ISOBMFF, including a four-character coded box type, a byte count of the box, and a payload.

Movie box 502 may contain metadata for tracks of file 500. Each track of file 500 may comprise a continuous stream of media data. Each of media data boxes 504 may include one or more samples 505. Each of samples 505 may comprise an audio or video access unit. Each access unit may comprise multiple coded pictures for multi-view coding or scalable video coding. For instance, an access unit may include one or more coded pictures for each layer.

Furthermore, in the example of FIG. 5, movie box 502 includes a track box 506. Track box 506 may enclose metadata for a track of file 500. In other examples, movie box 502 may include multiple track boxes for different tracks of file 500. Track box 506 includes a track reference box 508 and a media box 510. Track reference box 508 may include a track reference type box 509. Track reference type box 509 may be associated with a type (e.g., 'tbas') and a track identifier identifying another track. In accordance with the sixth technique of this disclosure, track reference boxes of tile tracks may or may not include track reference type boxes associated with the type identifier 'tbas'.

Media box 510 may contain all objects that declare information about the media data within the track. Media box 510 includes a media information box 512. Media information box 512 may contain all objects that declare characteristic information of the media of the track. Media information box 512 includes a sample table box 514. Sample table box 514 may specify sample-specific metadata.

In the example of FIG. 5, sample table box 514 includes a SampleDescription box 516, and SampleDescription box 516 includes Sample Entry 518. Sample Entry 518 includes EVC Decoder Configuration 520, which as described above, may include a toolset indication syntax element. In other examples, sample table box 514 may include other boxes in addition to SampleDescription box 516 and Sample Entry 518. Although not shown in FIG. 5, Sample Entry 518 may include a decoder configuration record. As described in more detail above, this disclosure describes techniques for including new types of important information in a sample entry such as Sample Entry 518.

Figure 6:
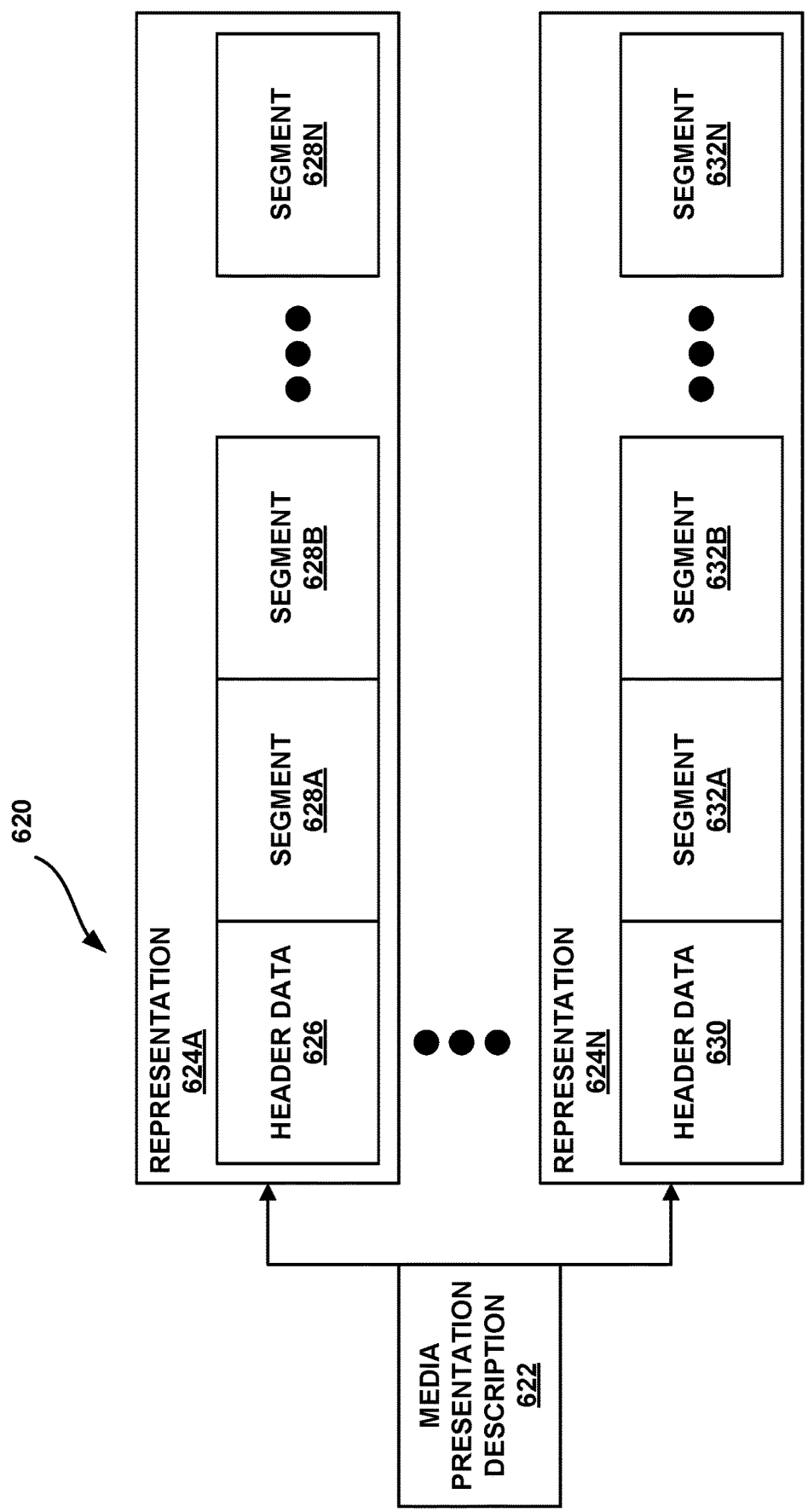
FIG. 6 is a conceptual diagram illustrating elements of example multimedia content.

FIG. 6 is a conceptual diagram illustrating elements of example multimedia content 620. In the example of FIG. 6, multimedia content 620 includes MPD 622 and a plurality of representations 624A-624N (representations 624). Representation 624A includes optional header data 626 and segments 628A-628N (segments 628), while representation 624N includes optional header data 630 and segments 632A-632N (segments 632). The letter N is used to designate the last movie fragment in each of representations 624 as a matter of convenience. In some examples, there may be different numbers of movie fragments between representations 624.

MPD 622 may comprise a data structure separate from representations 624. In general, MPD 422 may include data that generally describes characteristics of representations 424, such as coding and rendering characteristics, adaptation sets, a profile to which MPD 422 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 626, when present, may describe characteristics of segments 628, e.g., temporal locations of random access points (RAPs, also referred to as stream access points (SAPs)), which of segments 628 includes random access points, byte offsets to random access points within segments 628, uniform resource locators (URLs) of segments 628, or other aspects of segments 628. Header data 630, when present, may describe similar characteristics for segments 632. Additionally or alternatively, such characteristics may be fully included within MPD 622.

Segments 628, 632 include one or more coded video samples, each of which may include frames or slices of video data. Each of the coded video samples of segments 628 may have similar characteristics, e.g., height, width, and bandwidth requirements. Such characteristics may be described by data of MPD 622, though such data is not illustrated in the example of FIG. 6. MPD 622 may include characteristics as described by the 3GPP Specification, with the addition of any or all of the signaled information described in this disclosure.

Each of segments 628, 632 may be associated with a unique uniform resource locator (URL). Thus, each of segments 628, 632 may be independently retrievable using a streaming network protocol, such as DASH. In this manner, a destination device may use an HTTP GET request to retrieve segments 628 or 632. In some examples, the destination device may use HTTP partial GET requests to retrieve specific byte ranges of segments 628 or 632.

Figure 7:
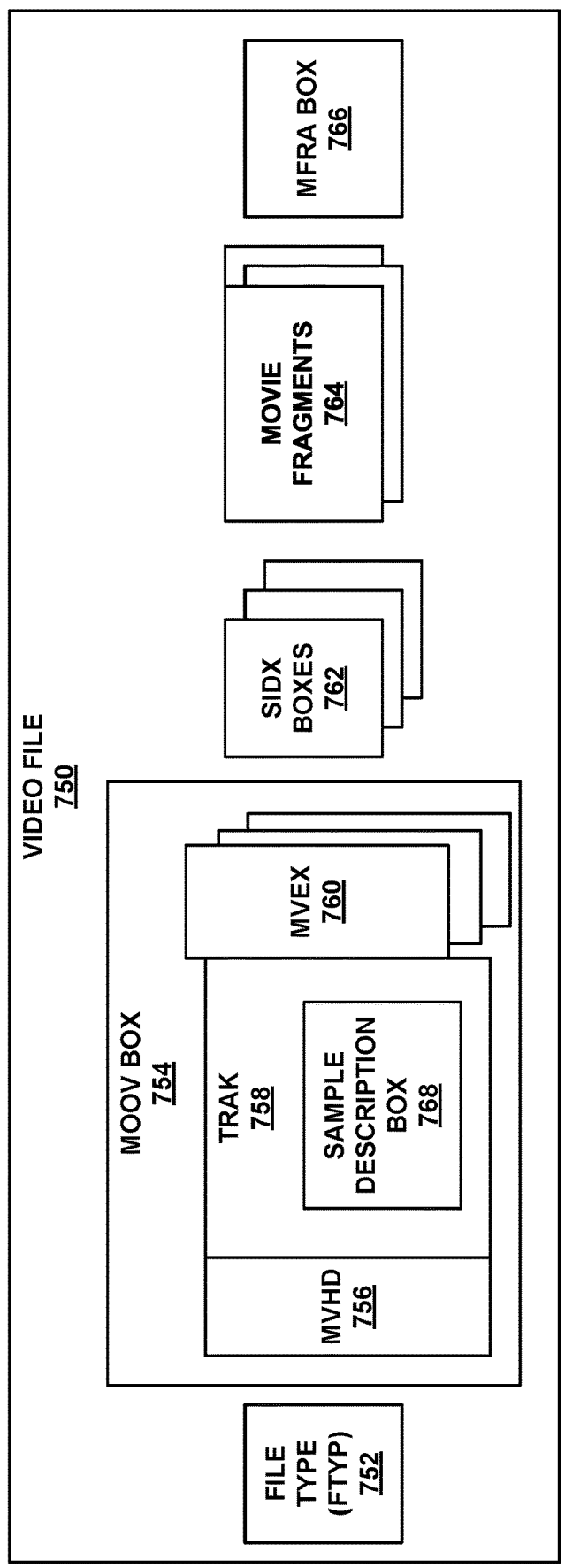
FIG. 7 is a block diagram illustrating elements of an example video file.

FIG. 7 is a block diagram illustrating elements of an example video file 750. Video file 750 may be said to encapsulate a segment. As described above, video files in accordance with the ISO base media file format and extensions thereof store data in a series of objects, referred to as "boxes." In the example of FIG. 7, video file 750 includes file type (FTYP) box 752, movie (MOOV) box 754, segment index (sidx) boxes 762, movie fragment (MOOF) boxes 764, and movie fragment random access (MFRA) box 766. Although FIG. 7 represents an example of a video file, it should be understood that other media files may include other types of media data (e.g., audio data, timed text data, or the like) that is structured similarly to the data of video file 750, in accordance with the ISO base media file format and its extensions.

FTYP box 752 generally describes a file type for video file 750. File type box 752 may include data that identifies a specification that describes a best use for video file 750. File type box 752 may alternatively be placed before MOOV box 754, movie fragment boxes 764, and/or MFRA box 766.

In some examples, a segment, such as video file 750, may include an MPD update box (not shown) before FTYP box 752. The MPD update box may include information indicating that an MPD corresponding to a representation including video file 750 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 750, where the STYP box may define a segment type for video file 750.

MOOV box 754, in the example of FIG. 7, includes movie header (MVHD) box 756, track (TRAK) box 758, and one or more movie extends (MVEX) boxes 760. In general, MVHD box 756 may describe general characteristics of video file 750. For example, MVHD box 756 may include data that describes when video file 750 was originally created, when video file 750 was last modified, a timescale for video file 750, a duration of playback for video file 750, or other data that generally describes video file 750.

TRAK box 758 may include data for a track of video file 750. TRAK box 758 may include a track header (TKHD) box that describes characteristics of the track corresponding to TRAK box 758. In some examples, TRAK box 758 may include coded video pictures, while in other examples, the coded video pictures of the track may be included in movie fragments 764, which may be referenced by data of TRAK box 758 and/or sidx boxes 762.

In some examples, video file 750 may include more than one track. Accordingly, MOOV box 754 may include a number of TRAK boxes equal to the number of tracks in video file 750. TRAK box 758 may describe characteristics of a corresponding track of video file 750. For example, TRAK box 758 may describe temporal and/or spatial information for the corresponding track. A TRAK box similar to TRAK box 758 of MOOV box 754 may describe characteristics of a parameter set track, when a parameter set track is included in a video file, such as video file 750. The presence of sequence level SEI messages may be signaled in the parameter set track within the TRAK box describing the parameter set track.

MVEX boxes 760 may describe characteristics of corresponding movie fragments 764, e.g., to signal that video file 750 includes movie fragments 764, in addition to video data included within MOOV box 754, if any. In the context of streaming video data, coded video pictures may be included in movie fragments 764 rather than in MOOV box 754. Accordingly, all coded video samples may be included in movie fragments 764, rather than in MOOV box 754.

MOOV box 754 may include a number of MVEX boxes 760 equal to the number of movie fragments 764 in video file 750. Each of MVEX boxes 760 may describe characteristics of a corresponding one of movie fragments 764. For example, each MVEX box may include a movie extends header box (MEHD) box that describes a temporal duration for the corresponding one of movie fragments 764.

A sequence data set may be stored in a video sample that does not include actual coded video data. A video sample may generally correspond to an access unit, which is a representation of a coded picture at a specific time instance. In the context of AVC, the coded picture includes one or more VCL NAL units which contains the information to construct all the pixels of the access unit and other associated non-VCL NAL units, such as SEI messages. Accordingly, a sequence data set, which may include sequence level SEI messages, may be included in one of movie fragments 764. The presence of a sequence data set and/or sequence level SEI messages may be signaled as being present in one of movie fragments 764 within the one of MVEX boxes 760 corresponding to the one of movie fragments 764.

SIDX boxes 762 are optional elements of video file 750. That is, video files conforming to the 3GPP file format, or other such file formats, do not necessarily include SIDX boxes 762. In accordance with the example of the 3GPP file format, a SIDX box may be used to identify a sub-segment of a segment (e.g., a segment contained within video file 750). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 762 generally provide information representative of one or more sub-segments of a segment included in video file 750. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 764 may include one or more coded video pictures. In some examples, movie fragments 764 may include one or more groups of pictures (GOPs), each of which may include a number of coded video pictures, e.g., frames or pictures. In addition, as described above, movie fragments 764 may include sequence data sets in some examples. Each of movie fragments 764 may include a movie fragment header box (MFHD, not shown in FIG. 7). The MFHD box may describe characteristics of the corresponding movie fragment, such as a sequence number for the movie fragment. Movie fragments 764 may be included in order of sequence number in video file 750.

MFRA box 766 may describe random access points within movie fragments 764 of video file 750. This may assist with performing trick modes, such as performing seeks to particular temporal locations (i.e., playback times) within a segment encapsulated by video file 750. MFRA box 766 is generally optional and need not be included in video files, in some examples. Likewise, a client device does not necessarily need to reference MFRA box 766 to correctly decode and display video data of video file 750. MFRA box 766 may include a number of track fragment random access (TFRA) boxes (not shown) equal to the number of tracks of video file 750, or in some examples, equal to the number of media tracks (e.g., non-hint tracks) of video file 750.

In some examples, movie fragments 764 may include one or more stream access points (SAPs), such as IDR pictures. Likewise, MFRA box 766 may provide indications of locations within video file 750 of the SAPs. Accordingly, a temporal sub-sequence of video file 750 may be formed from SAPs of video file 750. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Video file 750 also contains sample description box 768, in this example. In particular, sample description box 768 is included within TRAK box 758, in this example. In the example of FIG. 7, sample description box 768 does not include video data encoded according to the codec.

An example sample description box 768 may be defined as follows:

Sample Entry and Box Types: 'hvc2', 'hev2', 'lhv1', 'lhe1', 'lhvC'
Container: Sample Description Box ('stsd')
Mandatory: An 'hvc1', 'hev1', 'hvc2', 'hev2', 'lhv1', or 'lhe1' sample entry is mandatory
Quantity: One or more sample entries may be present In this example definition for sample description box 768, when the sample entry name is 'lhv1', the default and mandatory value of array_completeness is 4 for arrays of all types of parameter sets, and 0 for all other arrays. When the sample entry name is 'lhe1', the default value of array_completeness is 0 for all arrays.

Figure 8:
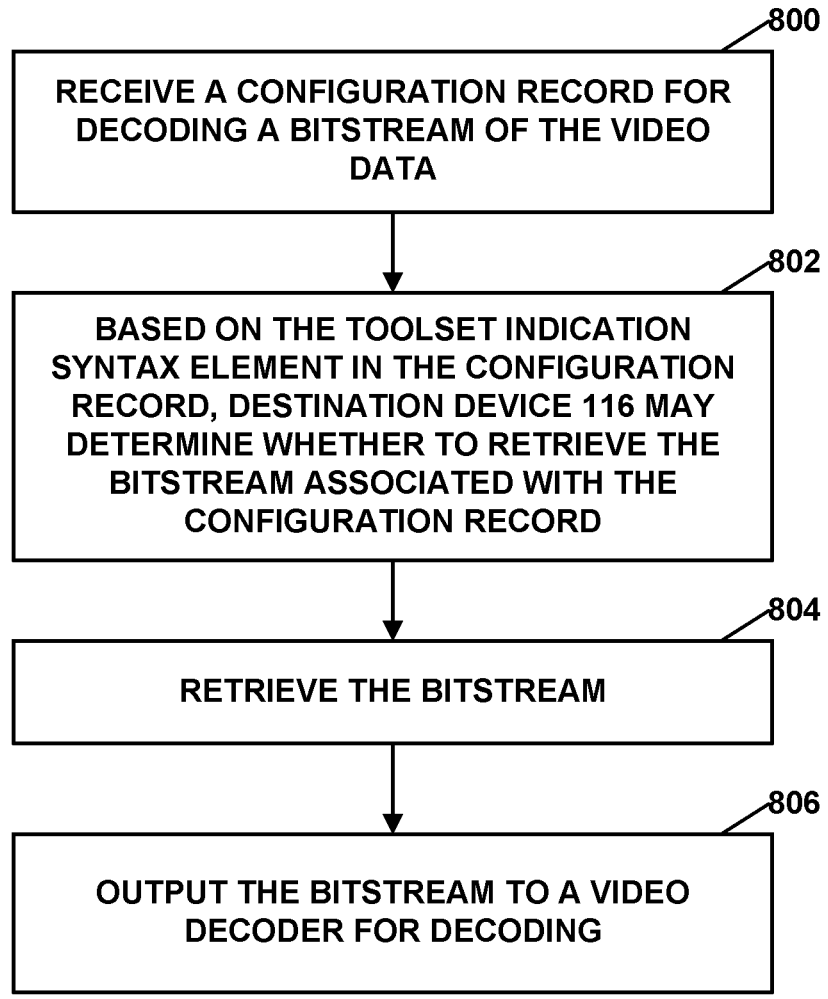
FIG. 8 is a flowchart illustrating an example method for process video data in accordance with the techniques of this disclosure.

FIG. 8 is a flowchart illustrating an example method for process video data in accordance with the techniques of this disclosure. Although described with respect to destination device 116 of FIG. 1, it should be understood that other devices may be configured to perform a method similar to that of FIG. 8.

Destination device 116 may be configured to receive a configuration record for decoding a bitstream of the video data (800). The configuration record for the bitstream may include a toolset indication syntax element that includes information identifying, from a set of video decoding tools, tools that are required to decode the bitstream associated with the configuration record. Based on the toolset indication syntax element in the configuration record, destination device 116 may determine whether to retrieve the bitstream associated with the configuration record (802). Destination device 116 may then retrieve the bitstream (804). Destination device 116 may output the bitstream to a video decoder for decoding (806). Destination device 116 may additionally or alternatively receive a MIME type parameter that includes a key value pair, wherein the key indicates that the MIME type identifies the video decoding tools, and the value identifies, from the video decoding tools, the tools that are required to decode the bitstream. The bitstream of video data may include one or more parameter sets, and each of the tools identified in the configuration record as being required to decode the bitstream may be enabled in at least one of the one or more parameter sets.

The toolset indication syntax element is signaled in a configuration box of file format information. The toolset indication syntax element that includes information identifying the tools that are required to decode the bitstream associated with the configuration record may identify all tools that are required to decode the bitstream associated with the configuration record. The toolset indication syntax element may be an unsigned 32-bit integer value, with each bit of the unsigned 32-bit integer value corresponding to a unique tool for decoding the bitstream.

The configuration record may be formatted in accordance with the essential EVC standard. The configuration record for the bitstream may include a profile syntax element and/or a level syntax element before the toolset indication syntax element. The configuration record for the bitstream may include a chroma format syntax element after the toolset indication syntax element.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The following clauses represent example implementations of the systems and techniques described above.

Clause 1. A method of processing a video stream or a video file, the method comprising: receiving a configuration record for decoding a bitstream of video data, wherein the configuration record for the bitstream includes a toolset indication syntax element that includes information identifying, from a set of video decoding tools, tools that are required to decode the bitstream associated with the configuration record; based on the toolset indication syntax element, determining whether to retrieve the bitstream associated with the configuration record; and based on the determination to retrieve the bitstream associated with the configuration record, retrieving the bitstream and outputting the bitstream to a video decoder for decoding.

Clause 2. The method of clause 1, further comprising: receiving a multipurpose internet mail extensions (MIME) type parameter that includes a key value pair, wherein the key indicates that the MIME type identifies the video decoding tools, and the value identifies the tools, from the video decoding tools, that are required to decode the bitstream.

Clause 3. The method of clause 1 or 2, wherein the bitstream of video data comprises one or more parameter sets, and wherein each of the tools identified in the configuration record as being required to decode the bitstream are enabled in at least one of the one or more parameter sets.

Clause 4. The method of any of clauses 1-3, wherein the toolset indication syntax element that includes information identifying the tools that are required to decode the bitstream associated with the configuration record identifies all tools that are required to decode the bitstream associated with the configuration record.

Clause 5. The method of any of clauses 1-4, wherein the configuration record is formatted in accordance with the essential video coding (EVC) standard.

Clause 6. The method any of clauses 1-5, wherein the toolset indication syntax element is signaled in a configuration box of file format information.

Clause 7. The method of any of clauses 1-6, wherein the toolset indication syntax element comprises an unsigned 32-bit integer value.

Clause 8. The method of clause 7, wherein bits of the unsigned 32-bit integer value each correspond to a unique tool for decoding the bitstream.

Clause 9. The method of any of clauses 1-8, wherein the configuration record for the bitstream includes a profile syntax element before the toolset indication syntax element.

Clause 10. The method of any of clauses 1-9, wherein the configuration record for the bitstream includes a level syntax element before the toolset indication syntax element.

Clause 11. The method of any of clauses 1-10, wherein the configuration record for the bitstream includes a chroma format syntax element after the toolset indication syntax element.

Clause 12. The method of any of clauses 1-11, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

Clause 13. A device for processing video data, the device comprising: a memory; and one or more processors implemented in the circuitry, coupled to the memory, and configured to: receive a configuration record for decoding a bitstream of video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

Clause 14. The device of clause 13, wherein the one or more processors are further configured to: receive a multipurpose internet mail extensions (MIME) type parameter that includes a key value pair, wherein the key indicates that the MIME type identifies the video decoding tools, and the value identifies the tools, from the video decoding tools, that are required to decode the bitstream.

Clause 15. The device of clause 13 or 14, wherein the bitstream of video data comprises one or more parameter sets, and wherein each of the tools identified in the configuration record as being required to decode the bitstream are enabled in at least one of the one or more parameter sets.

Clause 16. The device of any of clauses 13-15, wherein the toolset indication syntax element that includes information identifying the tools that are required to decode the bitstream associated with the configuration record identifies all tools that are required to decode the bitstream associated with the configuration record.

Clause 17. The device of any of clauses 13-16, wherein the configuration record is formatted in accordance with the essential video coding (EVC) standard.

Clause 18. The device any of clauses 13-117, wherein the toolset indication syntax element is signaled in a configuration box of file format information.

Clause 19. The device of any of clauses 13-15, wherein the toolset indication syntax element comprises an unsigned 32-bit integer value.

Clause 20. The device of clause 19, wherein bits of the unsigned 32-bit integer value each correspond to a unique tool for decoding the bitstream.

Clause 21. The device of any of clauses 13-20, wherein the configuration record for the bitstream includes a profile syntax element before the toolset indication syntax element.

Clause 22. The device of any of clauses 13-21, wherein the configuration record for the bitstream includes a level syntax element before the toolset indication syntax element.

Clause 23. The device of any of clauses 13-22, wherein the configuration record for the bitstream includes a chroma format syntax element after the toolset indication syntax element.

Clause 24. The device of any of clauses 13-23, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

Clause 25. A computer-readable storage medium storing instructions that when executed by one or more processors cause the one or more processors to: receive a configuration record for decoding a bitstream of the video data, wherein the configuration record for the bitstream includes a toolset indication syntax element that includes information identifying, from a set of video decoding tools, tools that are required to decode the bitstream associated with the configuration record; based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

Clause 26. The computer-readable storage medium of clause 25, wherein the instructions cause the one or more processors to: receive a multipurpose internet mail extensions (MIME) type parameter that includes a key value pair, wherein the key indicates that the MIME type identifies the video decoding tools, and the value identifies the tools, from the video decoding tools, that are required to decode the bitstream.

Clause 27. The computer-readable storage medium of clause 25 or 26, wherein the bitstream of video data comprises one or more parameter sets, and wherein each of the tools identified in the configuration record as being required to decode the bitstream are enabled in at least one of the one or more parameter sets.

Clause 28. The computer-readable storage medium of any of clauses 25-27, wherein the toolset indication syntax element that includes information identifying the tools that are required to decode the bitstream associated with the configuration record identifies all tools that are required to decode the bitstream associated with the configuration record.

Clause 29. The computer-readable storage medium of any of clauses 25-28, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

Clause 30. An apparatus for processing a video stream or a video file, the apparatus comprising: means for receiving a configuration record for decoding a bitstream of the video data, wherein the configuration record for the bitstream includes a toolset indication syntax element that includes information identifying, from a set of video decoding tools, tools that are required to decode the bitstream associated with the configuration record; means for determining whether to retrieve the bitstream associated with the configuration record based on the toolset indication syntax element; means for retrieving the bitstream based on the determination to retrieve the bitstream associated with the configuration record; and means for outputting the bitstream to a video decoder for decoding.

Clause 31. A method of processing video data, the method comprising: receiving a configuration record for decoding a bitstream of video data in accordance with the essential video coding (EVC) standard, wherein the configuration record for the bitstream includes a toolset indication syntax element that includes information of all tools that are required to decode the bitstream associated with the configuration record; based on the toolset indication syntax element, determining whether to retrieve the bitstream associated with the configuration record; and based on the determination to retrieve the bitstream associated with the configuration record, retrieving the bitstream and outputting the bitstream to a video decoder for decoding.

Clause 32. A method of processing video data, the method comprising: determine a configuration record for a bitstream of the video data generated by a video encoder in accordance with the essential video coding (EVC) standard, wherein the configuration record for the bitstream includes information for decoding the bitstream, and wherein the configuration record includes a toolset indication syntax element that includes information of all tools that are required to decode the bitstream associated with the configuration record; and signaling the configuration record.

Clause 33. The method of clause 31 or 32 wherein the toolset indication syntax element is signaled in a configuration box of file format information.

Clause 34. A device for processing video data, the device comprising: processing circuitry configured to perform the method of any one or combination of clauses 1-3.

Clause 35. The device of clause 34, further comprising a memory to store the video data.

Clause 36. The device of any of clauses 34 and 35, further comprising a display configured to display decoded video data.

Clause 37. The device of any of clauses 34-36, wherein the device comprises one or more of a camera, a computer, a mobile device, a broadcast receiver device, or a set-top box.

Clause 38. A computer-readable storage medium having stored thereon instructions that, when executed, cause one or more processors to perform the method of any of clauses 31-33.

Clause 39. A device for processing video data, the device comprising means for performing the method of any of clauses 31-33.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing a video stream or a video file, the method comprising:
    receiving a configuration record for decoding a bitstream of video data, wherein the configuration record for the bitstream includes a toolset indication syntax element that includes information identifying, from a set of video decoding tools, tools that are required to decode the bitstream associated with the configuration record;
    based on the toolset indication syntax element, determining whether to retrieve the bitstream associated with the configuration record; and
    based on the determination to retrieve the bitstream associated with the configuration record, retrieving the bitstream and outputting the bitstream to a video decoder for decoding.

2. The method of claim 1, further comprising:
    receiving a multipurpose internet mail extensions (MIME) type parameter that includes a key value pair, wherein the key indicates that the MIME type identifies the video decoding tools, and the value identifies the tools, from the video decoding tools, that are required to decode the bitstream.

3. The method of claim 1, wherein the bitstream of video data comprises one or more parameter sets, and wherein each of the tools identified in the configuration record as being required to decode the bitstream are enabled in at least one of the one or more parameter sets.

4. The method of claim 1, wherein the toolset indication syntax element that includes information identifying the tools that are required to decode the bitstream associated with the configuration record identifies all tools that are required to decode the bitstream associated with the configuration record.

5. The method of claim 1, wherein the configuration record is formatted in accordance with the essential video coding (EVC) standard.

6. The method claim 1, wherein the toolset indication syntax element is signaled in a configuration box of file format information.

7. The method of claim 1, wherein the toolset indication syntax element comprises an unsigned 32-bit integer value.

8. The method of claim 7, wherein bits of the unsigned 32-bit integer value each correspond to a unique tool for decoding the bitstream.

9. The method of claim 1, wherein the configuration record for the bitstream includes a profile syntax element before the toolset indication syntax element.

10. The method of claim 1, wherein the configuration record for the bitstream includes a level syntax element before the toolset indication syntax element.

11. The method of claim 1, wherein the configuration record for the bitstream includes a chroma format syntax element after the toolset indication syntax element.

12. The method of claim 1, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

13. A device for processing video data, the device comprising:
    a memory; and
    one or more processors implemented in the circuitry, coupled to the memory, and configured to:
        receive a configuration record for decoding a bitstream of video data, wherein the configuration record for the bitstream includes a toolset indication syntax element that includes information identifying, from a set of video decoding tools, tools that are required to decode the bitstream associated with the configuration record;

based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

14. The device of claim 13, wherein the one or more processors are further configured to:

receive a multipurpose internet mail extensions (MIME) type parameter that includes a key value pair, wherein the key indicates that the MIME type identifies the video decoding tools, and the value identifies the tools, from the video decoding tools, that are required to decode the bitstream.

15. The device of claim 13, wherein the bitstream of video data comprises one or more parameter sets, and wherein each of the tools identified in the configuration record as being required to decode the bitstream are enabled in at least one of the one or more parameter sets.

16. The device of claim 13, wherein the toolset indication syntax element that includes information identifying the tools that are required to decode the bitstream associated with the configuration record identifies all tools that are required to decode the bitstream associated with the configuration record.

17. The device of claim 13, wherein the configuration record is formatted in accordance with the essential video coding (EVC) standard.

18. The device claim 13, wherein the toolset indication syntax element is signaled in a configuration box of file format information.

19. The device of claim 13, wherein the toolset indication syntax element comprises an unsigned 32-bit integer value.

20. The device of claim 19, wherein bits of the unsigned 32-bit integer value each correspond to a unique tool for decoding the bitstream.

21. The device of claim 13, wherein the configuration record for the bitstream includes a profile syntax element before the toolset indication syntax element.

22. The device of claim 13, wherein the configuration record for the bitstream includes a level syntax element before the toolset indication syntax element.

23. The device of claim 13, wherein the configuration record for the bitstream includes a chroma format syntax element after the toolset indication syntax element.

24. The device of claim 13, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

25. A computer-readable storage medium storing instructions that when executed by one or more processors cause the one or more processors to:

receive a configuration record for decoding a bitstream of the video data, wherein the configuration record for the bitstream includes a toolset indication syntax element that includes information identifying, from a set of video decoding tools, tools that are required to decode the bitstream associated with the configuration record;

based on the toolset indication syntax element, determine whether to retrieve the bitstream associated with the configuration record; and based on the determination to retrieve the bitstream associated with the configuration record, retrieve the bitstream and outputting the bitstream to a video decoder for decoding.

26. The computer-readable storage medium of claim 25, wherein the instructions cause the one or more processors to:

receive a multipurpose internet mail extensions (MIME) type parameter that includes a key value pair, wherein the key indicates that the MIME type identifies the video decoding tools, and the value identifies the tools, from the video decoding tools, that are required to decode the bitstream.

27. The computer-readable storage medium of claim 25, wherein the bitstream of video data comprises one or more parameter sets, and wherein each of the tools identified in the configuration record as being required to decode the bitstream are enabled in at least one of the one or more parameter sets.

28. The computer-readable storage medium of claim 25, wherein the toolset indication syntax element that includes information identifying the tools that are required to decode the bitstream associated with the configuration record identifies all tools that are required to decode the bitstream associated with the configuration record.

29. The computer-readable storage medium of claim 25, wherein the configuration record comprises file format level data that encapsulates video coding layer (VCL) level encoded media data in the bitstream of the video data, wherein the VCL level encoded media data includes one or more parameter sets, and wherein each of the tools identified in the configuration record as being required to decode the bitstream are enabled in at least one of the one or more parameter sets.

30. An apparatus for processing a video stream or a video file, the apparatus comprising:

means for receiving a configuration record for decoding a bitstream of the video data, wherein the configuration record for the bitstream includes a toolset indication syntax element that includes information identifying, from a set of video decoding tools, tools that are required to decode the bitstream associated with the configuration record;

means for determining whether to retrieve the bitstream associated with the configuration record based on the toolset indication syntax element;

means for retrieving the bitstream based on the determination to retrieve the bitstream associated with the configuration record; and means for outputting the bitstream to a video decoder for decoding.

* * * * *